(12) United States Patent
Takeuchi et al.

(10) Patent No.: US 12,291,921 B2
(45) Date of Patent: May 6, 2025

(54) DEPRESSURIZED MULTILAYERED GLASS PANEL

(71) Applicant: NIPPON SHEET GLASS COMPANY, LIMITED, Tokyo (JP)

(72) Inventors: Akito Takeuchi, Tokyo (JP); Tatsuhiro Nakazawa, Tokyo (JP); Atsushi Miki, Tokyo (JP)

(73) Assignee: NIPPON SHEET GLASS COMPANY, LIMITED, Tokyo (JP)

( * ) Notice: Subject to any disclaimer, the term of this patent is extended or adjusted under 35 U.S.C. 154(b) by 316 days.

(21) Appl. No.: 17/910,983

(22) PCT Filed: Feb. 24, 2021

(86) PCT No.: PCT/JP2021/006765
§ 371 (c)(1),
(2) Date: Sep. 12, 2022

(87) PCT Pub. No.: WO2021/182099
PCT Pub. Date: Sep. 16, 2021

(65) Prior Publication Data
US 2023/0141217 A1   May 11, 2023

(30) Foreign Application Priority Data

Mar. 13, 2020   (JP) ................. 2020-044766

(51) Int. Cl.
*B32B 3/02*   (2006.01)
*B32B 3/08*   (2006.01)
(Continued)

(52) U.S. Cl.
CPC .......... *E06B 3/66304* (2013.01); *B32B 3/085* (2013.01); *B32B 17/06* (2013.01);
(Continued)

(58) Field of Classification Search
CPC ...... B32B 3/085; B32B 17/06; E06B 3/66304
See application file for complete search history.

(56) References Cited

U.S. PATENT DOCUMENTS

| 6,083,578 A | 7/2000 | Collins et al. |
| 6,372,312 B1 | 4/2002 | Aggas |

(Continued)

FOREIGN PATENT DOCUMENTS

| CN | 1274339 A | 11/2000 |
| EP | 0983974 A1 | 3/2000 |

(Continued)

OTHER PUBLICATIONS

First Japanese Office Action for Japanese Patent Application No. 2020-067476.
(Continued)

*Primary Examiner* — Elizabeth E Mulvaney
(74) *Attorney, Agent, or Firm* — Dilworth & Barrese, LLP.; Michael J. Musella, Esq.

(57) ABSTRACT

A depressurized multilayer glass panel 10 includes: a first glass plate 11; a second glass plate 12; a sealing portion forming an air gap portion 13 sealed in a depressurized state between the first glass plate 11 and the second glass plate 12; and a plurality of columns 16 disposed between the first glass plate 11 and the second glass plate 12, each column 16 including contact surfaces 21 in contact with facing surfaces 17, 18 of the first glass plate 11 and the second glass plate 12, and non-contact portion 23 provided around the contact surface 21 and spaced apart from the facing surfaces 17, 18 of the first glass plate 11 and the second glass plate 12, wherein the non-contact portion 23 is configured such that when the facing first glass plate 11 or second glass plate 12 is deformed by being subjected to a first external force, at (Continued)

least a part of the non-contact portion 23 is contactable with the deformed first glass plate 11 or second glass plate 12.

18 Claims, 10 Drawing Sheets

(51) Int. Cl.
  *B32B 17/06* (2006.01)
  *E06B 3/66* (2006.01)
  *E06B 3/663* (2006.01)
(52) U.S. Cl.
  CPC ...... *E06B 3/6612* (2013.01); *B32B 2307/304* (2013.01); *B32B 2307/558* (2013.01); *B32B 2607/00* (2013.01)

(56) References Cited

U.S. PATENT DOCUMENTS

| | | | |
|---|---|---|---|
| 6,479,112 B1* | 11/2002 | Shukuri | E06B 3/66304 |
| | | | 52/786.13 |
| 9,878,954 B2 | 1/2018 | Vogel-Martin et al. | |
| 10,626,055 B2 | 4/2020 | Humpal et al. | |
| 2010/0107525 A1* | 5/2010 | Grzybowski | C03B 23/0086 |
| | | | 52/204.591 |
| 2014/0335291 A1* | 11/2014 | Hasegawa | E06B 3/66333 |
| | | | 428/34 |
| 2014/0356558 A1 | 12/2014 | Hasegawa et al. | |
| 2015/0337591 A1* | 11/2015 | Koga | E06B 3/6612 |
| | | | 428/34 |
| 2016/0160555 A1* | 6/2016 | Petit | E06B 3/6612 |
| | | | 52/204.593 |
| 2017/0226791 A1 | 8/2017 | Hasegawa et al. | |
| 2017/0268284 A1 | 9/2017 | Collins et al. | |
| 2018/0066469 A1 | 3/2018 | Vogel-Martin et al. | |
| 2018/0238105 A1 | 8/2018 | Vogel-Martin et al. | |

FOREIGN PATENT DOCUMENTS

| | | |
|---|---|---|
| EP | 1018493 A1 | 7/2000 |
| JP | H11-270242 A | 10/1999 |
| JP | 11-315668 A | 11/1999 |
| JP | H11-343151 A | 12/1999 |
| JP | H11-349358 A | 12/1999 |
| JP | 2000-54744 A | 2/2000 |
| JP | 2016-044097 A | 4/2016 |
| JP | 2016-531081 A | 10/2016 |
| JP | 2018-504362 A | 2/2018 |
| JP | 2018-515407 A | 6/2018 |
| WO | 2013/085480 A1 | 6/2013 |
| WO | 2013/132867 A1 | 9/2013 |

OTHER PUBLICATIONS

Second Japanese Office Action for Japanese Patent Application No. 2020-067476.

Office Action mailed Aug. 23, 2023 in Chinese appln. No. 202180020143.7.

Extended Search Report issued Jan. 30, 2024 in corresponding European Application No. 21768838.1.

\* cited by examiner

DEPRESSURIZED MULTILAYERED GLASS PANEL

TECHNICAL FIELD

The present invention relates to a depressurized multilayer glass panel.

BACKGROUND ART

A depressurized multilayer glass panel includes a pair of glass plates and a plurality of columns disposed between the pair of glass plates and is configured such that an air gap portion in which the columns are disposed is provided between the pair of glass plates and kept in a depressurized state. When a temperature difference occurs between the pair of glass plates, part of the heat is transferred from one of the glass plates to the other of the glass plates through the columns. Such heat transfer is preferably as small as possible in terms of enhancing the thermal insulation performance in the depressurized multilayer glass panel. That is, in the depressurized multilayer glass panel, the lower the heat transfer rate (U-value), the more preferable. The heat transfer rate of the depressurized multilayer glass panel is proportional to the contact area between the pair of glass plates and the columns.

Patent Literature 1 discloses a configuration of a vacuum multilayer glass panel using cylinders with a diameter of 600 μm or less as columns. In this way, with the vacuum multilayer glass panel in which the diameter of the columns is small, the heat transfer rate can be made low.

CITATION LIST

Patent Literature

Patent Literature 1: Japanese Unexamined Patent Application Publication (Translation of PCT Application) No. 2016-531081

SUMMARY OF INVENTION

Technical Problem

In a depressurized multilayer glass panel, when one of glass plates is subjected to an external force such as an impact, it may be deformed toward the other of the glass plates, and when the external force is large, there is a possibility of damage to the glass plate. In order to suppress the deformation of the glass plate due to the external force, it is conceivable to take measures to increase the area of the columns in contact with the glass plate, but, in this case, the heat transfer rate is increased due to the increase in contact area between the pair of glass plates and the columns. While the vacuum multilayer glass panel of Patent Literature 1 is able to make the heat transfer rate low by the small diameter of the columns, there is a possibility that the strength against an external force such as an impact is not sufficient. In addition, in the vacuum multilayer glass panel of Patent Literature 1, the columns are each the cylinder, and therefore, when the glass plate is deformed, the deformed glass plate comes in contact with a peripheral corner being a boundary between a top or bottom surface and a side surface of the column. An angle formed by the corner is 90 degrees, and therefore, when the corner of the column is pressed against the glass plate deformed by the external force, the stress of the deformed glass plate is concentrated on a portion where the corner is pressed, so that the deformed glass plate subjected to the external force is susceptible to damage.

In view of the circumstances described above, a depressurized multilayer glass panel is required that can suppress damage to a glass plate subjected to an external force while keeping the heat transfer rate low.

Solution to Problem

A characteristic configuration of a depressurized multilayer glass panel according to the present invention resides in that the depressurized multilayer glass panel includes a first glass plate; a second glass plate disposed to face the first glass plate; a sealing portion provided around respective entire outer peripheries of the first glass plate and the second glass plate to form an air gap portion between the first glass plate and the second glass plate, the air gap portion sealed in a depressurized state; and a plurality of columns disposed between the first glass plate and the second glass plate, each column including contact surfaces in contact with respective facing surfaces of the first glass plate and the second glass plate, and a non-contact portion provided around the contact surface and spaced apart from the facing surface of the first glass plate or the second glass plate, wherein the non-contact portion is configured such that when the facing first glass plate or second glass plate is deformed by being subjected to a first external force, at least a part of the non-contact portion is contactable with the deformed first glass plate or second glass plate.

According to this configuration, the column has the contact surfaces in contact with the facing surfaces of the first glass plate and the second glass plate, and the non-contact portion provided around the contact surface. Consequently, it is possible to reduce the contact area of the column with the first glass plate and the second glass plate. As a result, the heat transfer rate can be made low in the depressurized multilayer glass panel.

Further, the non-contact portion of the column is spaced apart from the facing surface of the first glass plate or the second glass plate, and is configured such that at least a part of the non-contact portion is contactable with the first glass plate or the second glass plate deformed by being subjected to the first external force. Herein, the first external force refers to an external force that can deform the first glass plate or the second glass plate to come in contact with the non-contact portion of the column. Consequently, the glass plate deformed by being subjected to the first external force comes in contact with the non-contact portion around the contact surface of the column, and therefore, the stress that acts on the glass plate is distributed. As a result, the depressurized multilayer glass panel is able to enhance the impact strength and thus suppress damage to the glass plate.

Another characteristic configuration resides in that the non-contact portion being configured to be contactable refers to a configuration such that when the first glass plate or the second glass plate is deformed by being subjected to a second external force, the deformed first glass plate or second glass plate comes in contact with the non-contact portion before the deformed first glass plate or second glass plate comes in contact with the facing first glass plate or second glass plate.

According to this configuration, the first glass plate or the second glass plate deformed by being subjected to the second external force comes in contact with the non-contact portion of the column before coming in contact with the facing first glass plate or second glass plate. Herein, the second external force refers to an external force that can deform the first glass plate or the second glass plate to come in contact with the facing first glass plate or second glass plate. Consequently, the glass plate deformed by being subjected to the second external force securely comes in contact with the non-contact portion before coming in contact with the facing glass plate, and thus can be supported while distributing the stress. As a result, the depressurized multilayer glass panel is able to suppress damage to the glass plate.

Another characteristic configuration resides in that the columns each further includes a non-contact surface extending outward continuously from a periphery of the contact surface and spaced gradually farther apart from the facing surface of the first glass plate or the second glass plate toward an outer periphery of the column, and that the non-contact portion is on the non-contact surface.

According to this configuration, the glass plate deformed by being subjected to the external force comes in contact with the non-contact portion on the non-contact surface extending continuously from the periphery of the contact surface of the column so that the acting stress is distributed. As a result, the depressurized multilayer glass panel is able to enhance the impact strength and thus suppress damage to the glass plate.

Another characteristic configuration resides in that the column further includes a non-contact surface extending outward continuously from a periphery of the contact surface and spaced gradually farther apart from the facing surface of the first glass plate or the second glass plate toward an outer periphery of the column, and that the non-contact portion is a part of the non-contact surface.

According to this configuration, the glass plate deformed by being subjected to the external force comes in contact with the non-contact portion being a part of the non-contact surface extending continuously from the periphery of the contact surface of the column so that the acting stress is distributed. As a result, the depressurized multilayer glass panel is able to enhance the impact strength and thus suppress damage to the glass plate.

Another characteristic configuration resides in that the columns each have a gradient angle between the facing surface of the first glass plate or the second glass plate and the non-contact surface, the gradient angle being such that when the first glass plate or the second glass plate is deformed by being subjected to the first external force, at least a part of the non-contact surface is contactable with the deformed first glass plate or second glass plate.

According to this configuration, the columns each have a gradient angle between the facing surface of the first glass plate or the second glass plate and the non-contact surface, the gradient angle being such that at least a part of the non-contact surface is contactable with the deformed first glass plate or second glass plate. Therefore, it is possible to make the deformed glass plate properly come in contact with the non-contact surface of the column.

As another characteristic configuration, it is preferable that the gradient angle of the column be set to less than 65 degrees.

When the first glass plate or the second glass plate is deformed by being subjected to the first external force, a deformed portion of the glass plate is deformed at an acute angle from the facing surface before the deformation in the glass plate while being supported by the column. Therefore, like this configuration, by setting the gradient angle of the column formed between the facing surface of the first glass plate or the second glass plate and the non-contact surface to less than 65 degrees, it is possible to make the deformed glass plate come in contact with the non-contact surface of the column.

As another characteristic configuration, it is preferable that the gradient angle of the column be set to 0.4 degrees or more.

The minimum angle of the gradient angle of the column formed between the facing surface of the first glass plate or the second glass plate and the non-contact surface is set based on a gradient angle in a normal resting state that is formed between the facing surface of the glass plate in contact with the column and the facing surface of the glass plate around the column when only the atmospheric pressure is applied to the first glass plate or the second glass plate. While affected by the material or thickness of the glass plate, the material, size, or shape of the column, or the like, the initial gradient angle generally becomes less than 0.4 degrees. Therefore, in this configuration, the gradient angle formed between the facing surface of the first glass plate or the second glass plate and the non-contact surface is set to 0.4 degrees or more. Consequently, it is possible to make the first glass plate or the second glass plate come in contact with the non-contact surface when deformed by being subjected to the first external force.

As another characteristic configuration, it is preferable that the contact surface of the column be in a shape of a spherical cap.

Like this configuration, when the contact surface of the column is in a shape of the spherical cap, since a pressing force by the contact surface on the facing surface of the first glass plate or the second glass plate is increased, the column is restrained from moving from the position where the column is disposed between the first glass plate and the second glass plate.

As another characteristic configuration, it is preferable that the contact surface of the column be planar.

Like this configuration, when the contact surface of the column is planar, the contact surface is in uniform surface contact with the facing surface of the first glass plate or the second glass plate, and therefore, the column hardly falls so that its posture is easily held between the first glass plate and the second glass plate.

As another characteristic configuration, it is preferable that the non-contact portion of the column be formed straight toward the outer periphery.

Like this configuration, when the non-contact portion of the column is formed straight toward the outer periphery, the inclination (gradient angle) for the deformed first glass plate or second glass plate to come in contact with the non-contact surface of the column can be easily set.

As another characteristic configuration, it is preferable that the contact surface and the non-contact portion of the column be in a shape of a spherical cap with a constant radius as a whole.

Like this configuration, when the contact surface and the non-contact portion of the column are in a shape of the spherical cap with the constant radius as a whole, since the contact surface and the non-contact portion are smoothly continuous with each other, the non-contact portion easily comes in contact with the deformed first glass plate or second glass plate therealong. Further, when, for example, the column is formed using a mold, it is easy to withdraw a spherical cap-shaped portion of the column from the mold. Therefore, it is also possible to form the column at low cost.

As another characteristic configuration, it is preferable that a radius of curvature of the contact surface and the non-contact portion be 0.3 mm or more and 20 mm or less.

According to this configuration, the radius of curvature of the contact surface and the non-contact portion is set within the predetermined range, and therefore, the contact surface and the non-contact portion can be easily formed in the column.

As another characteristic configuration, it is preferable that, in a falling ball test in which the columns each having the contact surface with a diameter of 0.2 mm and each having a height of 0.2 mm are disposed at an interval of 20 mm between the first glass plate and the second glass plate each being 350 mm×350 mm and having a plate thickness of 3.1 mm, and a ball of 1 kg is dropped at a central position of the first glass plate and at a middle position between the adjacent columns from above the first glass plate, the first external force be a force when the ball has an upper limit height of 100 mm within which the ball does not damage the first glass plate.

According to this configuration, it is possible to configure the vacuum multilayer glass panel with high impact strength.

As another characteristic configuration, it is preferable that a heat transfer rate be equal to or less than 1.5 W/m2K.

Like this configuration, when the heat transfer rate is equal to or less than 1.5 W/m2K, it is possible to obtain the vacuum multilayer glass panel with high thermal insulation.

As another characteristic configuration, it is preferable that a maximum diameter of regions of the column facing the first glass plate and the second glass plate be 100 μm or more and 1000 μm or less.

Even if the contact surfaces of the column with the first glass plate and the second glass plate are made small, when the maximum diameter of the regions facing the first glass plate and the second glass plate is increased, the amount of heat that can be stored in the column is increased so that the heat flow rate between the glass plates and the column is increased. Therefore, in this configuration, the maximum diameter of the regions facing the first glass plate and the second glass plate is set to 100 μm or more and 1000 μm or less. Consequently, the column is miniaturized as a whole, and therefore, it is possible to suppress the increase in heat flow rate between the glass plates and the column.

As another characteristic configuration, it is preferable that a maximum diameter of the contact surface be greater than 100 μm.

Like this configuration, when the maximum diameter of the contact surface is greater than 100 μm, the contact area of the column with the first glass plate and the second glass plate is ensured. Consequently, it is possible to stably hold the column between the first glass plate and the second glass plate.

As another characteristic configuration, it is preferable that a length of the column in a direction perpendicular to plate surfaces of the first glass plate and the second glass plate be 50 μm or more and 500 μm or less.

Like this configuration, when the length of the column in the direction perpendicular to the plate surfaces of the first glass plate and the second glass plate is 50 μm or more and 500 μm or less, since the column is miniaturized, it is possible to suppress the increase in heat flow rate between the glass plates and the column.

As another characteristic configuration, it is preferable that a compressive strength of the column be equal to or more than 200 MPa.

Like this configuration, when the compressive strength of the column is equal to or more than 200 MPa, the column is able to securely keep the interval between the first glass plate and the second glass plate without being compressively deformed.

As another characteristic configuration, it is preferable that the columns each contain zirconia.

Like this configuration, when the columns each contain the zirconia, it is possible to easily enhance the lower thermal conductivity, the heat resistance, and the strength in the column.

As another characteristic configuration, it is preferable that a shape of the column as viewed in a direction perpendicular to the plate surfaces of the first glass plate and the second glass plate be any of a circular shape including an ellipse and an elongated circle, a rectangular shape, a triangular shape, and a polygonal shape with five or more corners.

According to this configuration, since the column can be formed by various shapes, the shape of the column can be freely selected in consideration of the type of glass plate, visibility of the vacuum multilayer glass panel from the outside, and so forth.

DESCRIPTION OF EMBODIMENTS

First Embodiment

Hereinafter, a depressurized multilayer glass panel according to the present invention will be described with reference to the drawings.

Figure 1:
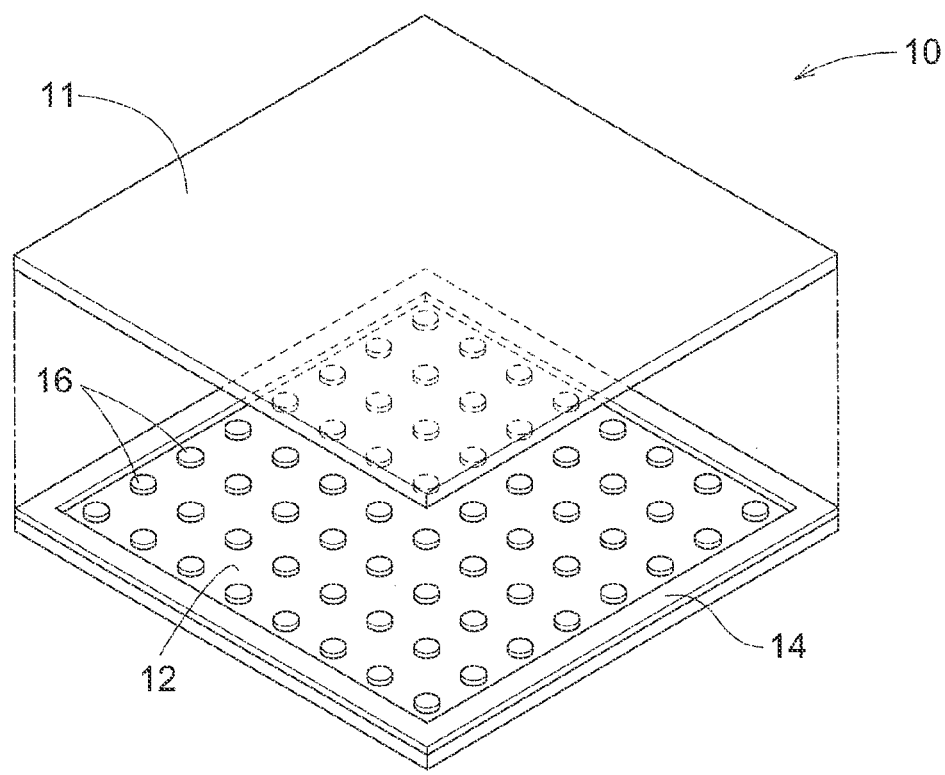
FIG. 1 is an exploded perspective view illustrating a depressurized multilayer glass panel of a first embodiment.
Figure 2:
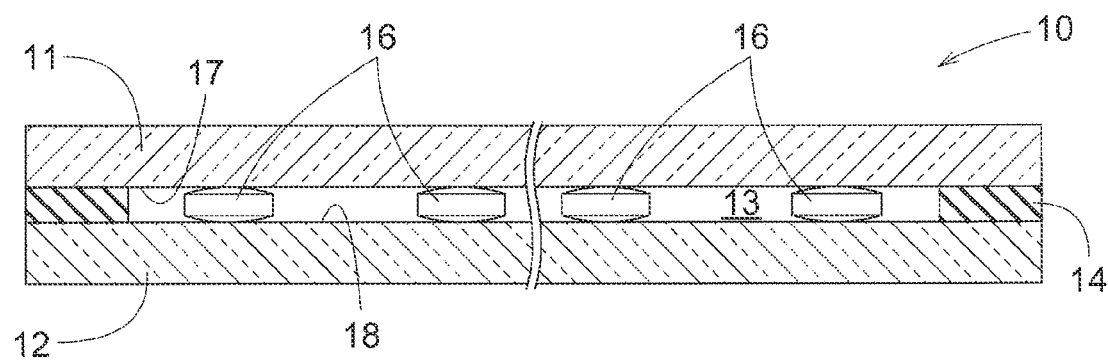
FIG. 2 is a longitudinal sectional view of the depressurized multilayer glass panel.

As illustrated in FIGS. 1 and 2, a vacuum multilayer glass panel 10 includes a first glass plate 11, a second glass plate 12 disposed to face the first glass plate 11, a sealing portion 14 provided around the respective entire outer peripheries of the first glass plate 11 and the second glass plate 12, and a plurality of columns 16 disposed between the first glass plate 11 and the second glass plate 12. The vacuum multilayer glass panel 10 (hereinafter abbreviated as a "glass panel") is one example of a depressurized multilayer glass panel.

The glass panel 10 is configured such that an air gap portion 13 with a predetermined space is formed between the first glass plate 11 and the second glass plate 12, and that the air gap portion 13 is sealed in a vacuum state by the sealing portion 14. In order to form the air gap portion 13, the sealing portion 14 is formed around the entire outer peripheries of the glass plates 11, 12 in a state where a predetermined space is kept between facing surfaces 17, 18 of the glass plates 11, 12 by disposing the columns 16 between the facing surfaces 17, 18. The sealing portion 14 is made of a sealing material or the like. In order to place the air gap portion 13 in a vacuum state, the outer peripheral portion of the air gap portion 13 is sealed by the sealing portion 14 and then the air gap portion 13 is evacuated through a suction port (not illustrated) provided, for example, in the first glass plate 11. After the evacuation, the suction port is sealed by fusion of low melting point glass or the like. Note that, in the depressurized multilayer glass panel, the air gap portion 13 is sealed in a depressurized state lower than the atmospheric pressure.

Figure 3:
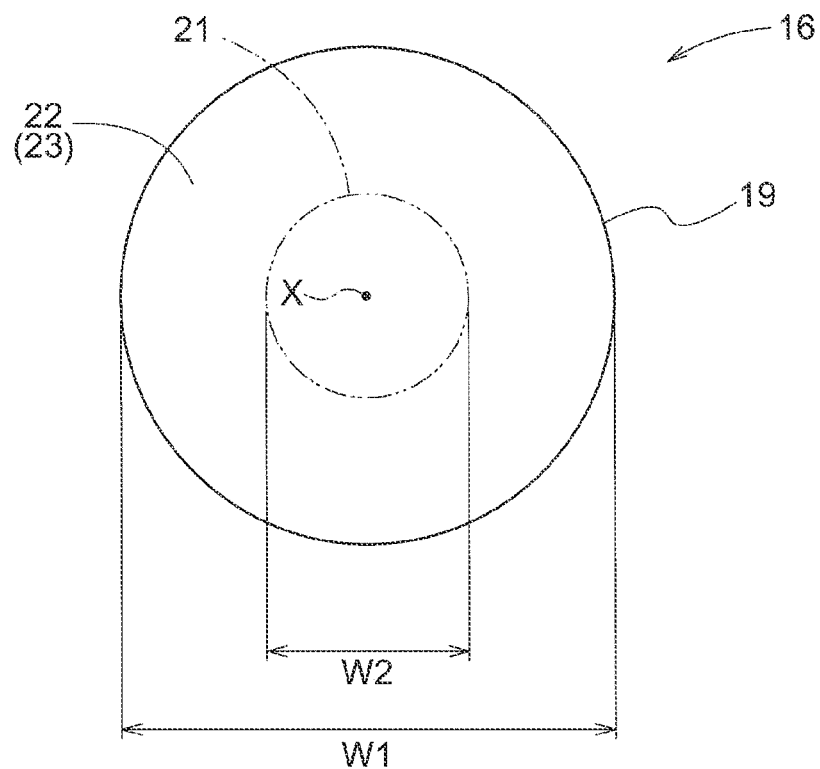
FIG. 3 is a plan view of a column.
Figure 4:
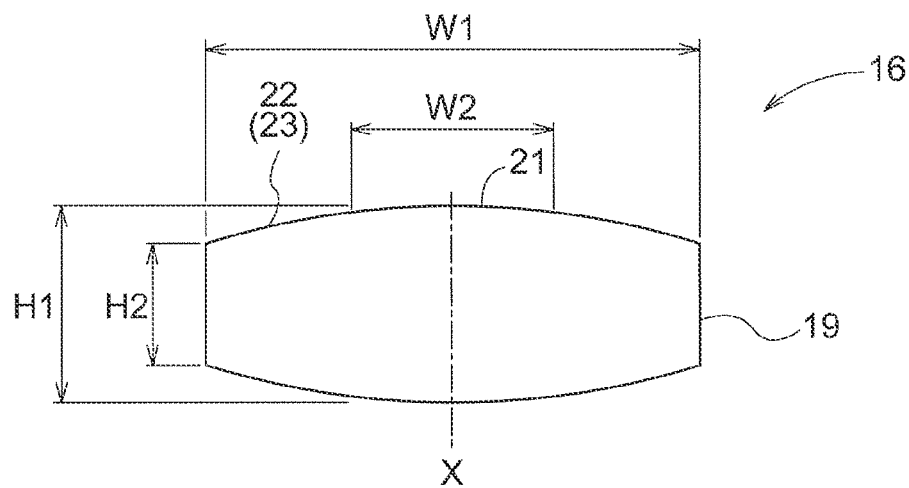
FIG. 4 is a side view of the column.

As illustrated in FIGS. 3 and 4, when viewed along the central axis X, the column 16 has, in each of a top surface and a bottom surface, a circular contact surface 21 with the central axis X at its center, and an annular non-contact portion 23 provided around the contact surface 21. In this embodiment, the non-contact portion 23 is formed by a non-contact surface 22. Both the contact surfaces 21, 21 of the column 16 are respectively in contact with the facing surfaces 17, 18 of the glass plates 11, 12. The non-contact surfaces 22 (the non-contact portions 23) are respectively spaced apart from the facing surfaces 17, 18 of the first glass plate 11 and the second glass plate 12. The non-contact surfaces 22 (the non-contact portions 23) each extend outward continuously from the periphery of the contact surface 21 and are each spaced gradually farther apart from the facing first glass plate 11 or second glass plate 12 toward an outer periphery 19 of the column 16.

The non-contact surfaces 22 are each integrally connected to the contact surface 21 around the entire circumference of the column 16 about the central axis X so that the column 16 is formed in a disk shape. In this way, since the column 16 has the non-contact surfaces 22 each located around the periphery of the contact surface 21, contact regions R1 of the contact surfaces 21 can be made small. Consequently, the heat transfer rate can be made low in the glass panel 10.

In this embodiment, the column 16 is configured such that the contact surface 21 and the non-contact surface 22 facing each of the first glass plate 11 and the second glass plate 12 are in a shape of a spherical cap with a constant radius as a whole. When the contact surfaces 21 of the column 16 are each in a shape of the spherical cap, since pressing forces by the contact surfaces 21 on the facing surfaces 17, 18 of the first glass plate 11 and the second glass plate 12 are increased, the column 16 is easily held in position between the first glass plate 11 and the second glass plate 12. Further, when the contact surface 21 and the non-contact surface 22 are in a shape of the spherical cap with the constant radius as a whole, the non-contact surface 22 easily comes in contact with the deformed first glass plate 11 or second glass plate 12 therealong. Further, when, for example, the column 16 is formed using a mold, it is easy to withdraw spherical cap-shaped portions of the column 16 from the mold. Therefore, it is also possible to form the column 16 at low cost. In the column 16, the contact surface 21 and the non-contact surface 22 (the non-contact portion 23) have a shape of a spherical cap with a radius of curvature of 0.3 mm or more and 20 mm or less. In this way, by setting the radius of curvature of the contact surface 21 and the non-contact surface 22 (the non-contact portion 23) within the predetermined range, the contact surface 21 and the non-contact surface 22 (the non-contact portion 23) can be easily formed in the column 16.

In the glass panel 10, the heat transfer rate (U-value) is equal to or less than 1.5 W/m2K. When the heat transfer rate of the glass panel 10 is equal to or less than 1.5 W/m2K, the glass panel 10 has sufficient thermal insulation. Herein, "the heat transfer rate (U-value)" is a value measured in accordance with "ISO 19916-1:2018 Glass in building—Vacuum insulating glass—Part 1".

Figure 5:
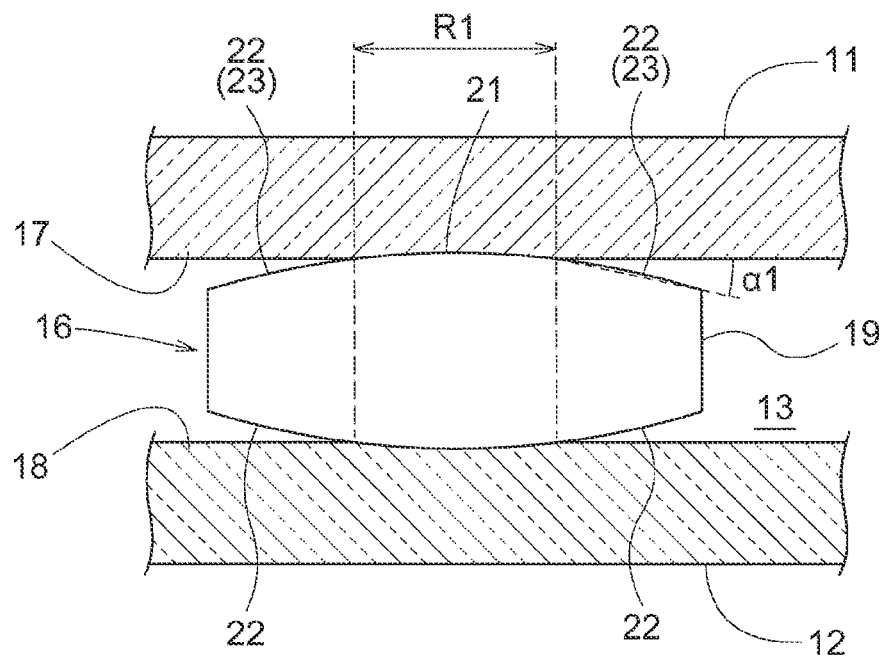
FIG. 5 is a main part longitudinal sectional view of the depressurized multilayer glass panel.

The glass panel 10 illustrated in FIG. 5 is in a normal state where only the contact surfaces 21 (contact regions R1) of the column 16 are in contact with the facing surfaces 17, 18 of the first glass plate 11 and the second glass plate 12. Since the Young's modulus of the column 16 is higher than that of the first glass plate 11 and the second glass plate 12, when the column 16 is pressed against them, the facing surfaces 17, 18 of the first glass plate 11 and the second glass plate 12 are deformed to dent.

Figure 6:
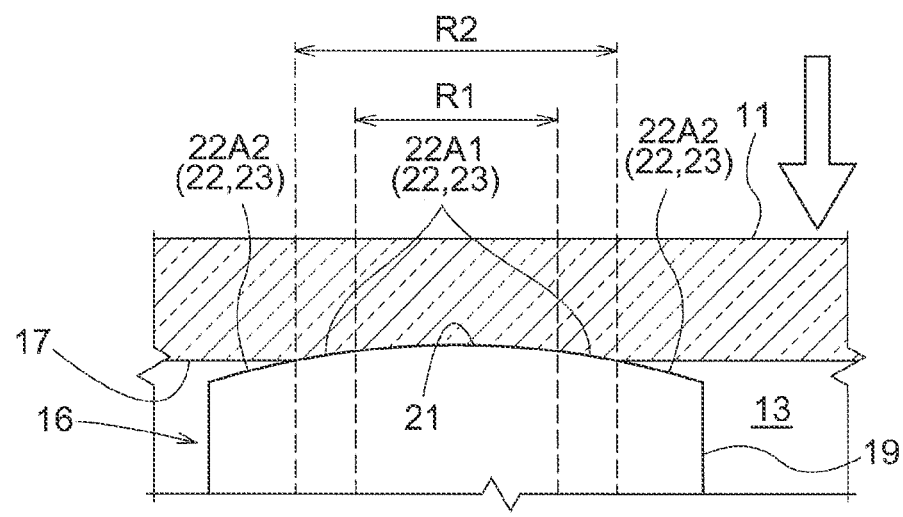
FIG. 6 is a main part longitudinal sectional view illustrating a state when the depressurized multilayer glass panel is subjected to an external force.

The glass panel 10 illustrated in FIG. 6 is in a state where the first glass plate 11 is subjected to an external force so that the facing surface 17 in contact with the column 16 is deformed. When the first glass plate 11 is deformed in this way, the column 16 comes in contact with the facing surface 17 not only at the contact surface 21 but also at an inner side surface 22A being a part of the non-contact surface 22 so that the contact region R1 is expanded to a contact region R2. Consequently, only an outer side surface 22B of the non-contact surface 22 other than the inner side surface 22A is in non-contact with the facing surface 17. Specifically, the contact region R1 is expanded to the contact region R2 so that bending occurring on the facing surface 17 of the first glass plate 11 is supported by the contact surface 21 and the inner side surface 22A of the non-contact surface 22.

In this way, the non-contact surface 22 (the non-contact portion 23) is configured such that when the facing first glass plate 11 or second glass plate 12 is deformed by being subjected to a first external force, at least a part of the non-contact surface 22 (the non-contact portion 23) is able to come in contact with the deformed first glass plate 11 or second glass plate 12. Herein, the first external force refers to an external force that can deform the first glass plate 11 or the second glass plate 12 to come in contact with the non-contact surface 22 (the non-contact portion 23) of the column 16.

The non-contact surface 22 (the non-contact portion 23) being configured such that at least a part of it is able to come in contact with the deformed first glass plate 11 or second glass plate 12 refers to a configuration such that when the first glass plate 11 or the second glass plate 12 is deformed by being subjected to a second external force, the deformed first glass plate 11 or second glass plate 12 comes in contact with the non-contact surface 22 (the non-contact portion 23) before the deformed first glass plate 11 or second glass plate 12 comes in contact with the facing first glass plate 11 or second glass plate 12. Herein, the second external force refers to an external force that can deform the first glass plate 11 or the second glass plate 12 to come in contact with the facing first glass plate 11 or second glass plate 12.

In this way, the first glass plate 11 deformed by being subjected to the first external force or the second external force comes in contact with the non-contact surface 22 extending continuously from the periphery of the contact surface 21 of the column 16, and therefore, the contact area is increased and there is no occurrence of the pressing of the corner as in the invention of Patent Literature 1, so that the stress that acts on the first glass plate 11 is distributed. As a result, the glass panel 10 is able to enhance the impact strength and thus suppress damage to the first glass plate 11 subjected to an external force such as an impact.

The column 16 is configured such that a gradient angle $\alpha 1$ is set between the facing surface 17, 18 of the first glass plate 11 or the second glass plate 12 and the non-contact surface 22. The gradient angle $\alpha 1$ is an angle such that when the first glass plate 11 or the second glass plate 12 facing the non-contact surface 22 is deformed by being subjected to the first external force, at least a part of the non-contact surface 22 is able to come in contact with the deformed first glass plate 11 or second glass plate 12, and is an angle formed by a tangent line passing through a boundary between the contact surface 21 and the non-contact surface 22 and the facing surface 17 or the facing surface 18. By properly setting the gradient angle $\alpha 1$ in the column 16, it is possible to make the deformed first glass plate 11 or second glass plate 12 come in contact with the non-contact surface 22 of the column 16.

Figure 7:
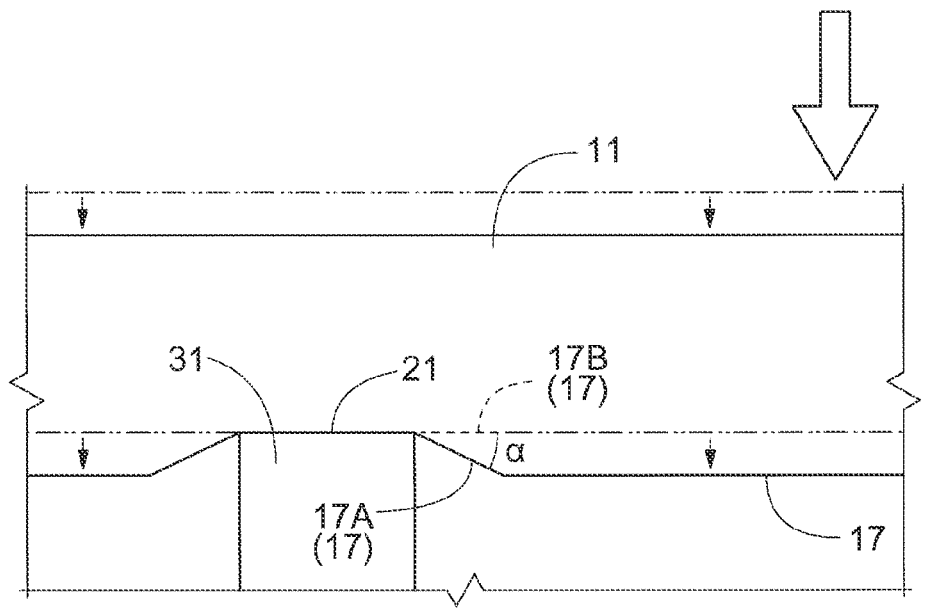
FIG. 7 is a diagram for explaining a gradient angle of the column.

The gradient angle $\alpha 1$ is set based on a gradient angle $\alpha$ shown in FIG. 7. FIG. 7 illustrates, by way of example, a state where the first glass plate 11 is deformed with respect to a cylindrical column 31. In this case, the gradient angle $\alpha$ is an angle that is formed between a facing surface 17A after the deformation and a facing surface 17B before the deformation in the first glass plate 11 when the first glass plate 11 is subjected to the first external force. In FIG. 7, the facing surface 17B before the deformation is illustrated by a two-dot chain line, and the facing surface 17A after the deformation is illustrated by a solid line. The gradient angle $\alpha$ can be increased to an extent where the first glass plate 11 is broken. The maximum value of the gradient angle $\alpha$ changes according to the material or thickness of the first glass plate 11 and the second glass plate 12, the material, size, or shape of the column 16, or the like. When, for example, the maximum value of the gradient angle $\alpha$ is set to 65 degrees, the gradient angle $\alpha 1$ is set to less than 65 degrees, preferably less than 55 degrees, and more preferably less than 40 degrees. By setting the gradient angle $\alpha 1$ of the column 16 to less than 65 degrees, it is possible to make the deformed glass plate 11, 12 come in contact with the non-contact surface 22 of the column 16.

The minimum angle of the gradient angle $\alpha 1$ is set based on a gradient angle $\alpha 0$ in a normal resting state that is formed between the facing surface 17 of the first glass plate 11 in contact with the column 16 and the facing surface 17 of the first glass plate 11 around the column 16 when only the atmospheric pressure is applied to the first glass plate 11 illustrated in FIG. 7. While affected by the material or thickness of the first glass plate 11 and the second glass plate 12, the material, size, or shape of the column 16, or the like, the gradient angle $\alpha 0$ generally becomes less than 0.4 degrees. Therefore, the gradient angle $\alpha 1$ can be set to 0.4 degrees or more. Consequently, it is possible to make the glass plate 11, 12 come in contact with the non-contact surface 22 when deformed by being subjected to the first external force.

The column 16 is made of ceramic such as alumina or zirconia, or the like. The column 16 may contain a nanoparticle filler such as zirconia. When the column 16 contains the zirconia, it is possible to easily enhance the lower thermal conductivity, the heat resistance, and the strength in the column 16. As examples of the material of the column 16, there can be cited ceramic nanoparticles ($Al_2O_3$, $SiO_2$, $ZrO_2$, SiC, $Si_3N_4$, and combinations thereof), ceramic precursors such as SSQ and polysilazane, sintered ceramics ($Al_2O_3$, $SiO_2$, $ZrO_2$, SiC, $Si_3N_4$, zircon, steatite, cordierite, aluminum titanate, etc.), glasses (silica, soda lime, borosilicate, etc.), glass ceramics (crystallized glass), glass frits, glass beads or glass bubbles, metals (SUS304, SUS430, SUS410, iron, nickel, etc.), resins (polyimide, polyamide, PEEK, PTFE, etc.), and combinations thereof. The column 16 of this embodiment is made of a material with a strength greater than that of the glass plates 11, 12. Therefore, even when the glass plates 11, 12 are deformed, the column 16 is able to keep its shape constant.

In the column 16, a maximum diameter W1 (FIG. 3) of regions facing the facing surfaces 17, 18 of the first glass plate 11 and the second glass plate 12 is set to 100 μm or more and 1000 μm or less. Even if the contact surfaces 21 of the column 16 with the first glass plate 11 and the second glass plate 12 are made small, when the maximum diameter W1 of the regions facing the first glass plate 11 and the second glass plate 12 is increased, the amount of heat that can be stored in the column 16 is increased so that the heat flow rate between the glass plates 11, 12 and the column 16 is increased. By setting the maximum diameter W1 of the column 16 to 100 μm or more and 1000 μm or less, the column 16 is miniaturized as a whole, and therefore, it is possible to suppress the increase in heat flow rate between the glass plates 11, 12 and the column 16. Note that, in terms of stably supporting the first glass plate 11 and the second glass plate 12, a maximum diameter W2 of the contact surfaces 21 is preferably greater than 100 μm.

In the column 16, a total height (thickness) H1 being the length in a direction perpendicular to the facing surfaces 17, 18 (plate surfaces) of the first glass plate 11 and the second glass plate 12 is set to 50 μm or more and 500 μm or less. A height (thickness) H2 of the outer periphery 19 of the column 16 is set as appropriate based on the gradient angle $\alpha 1$.

The compressive strength of the column 16 is equal to or more than 200 MPa. Consequently, the column 16 is able to securely keep the interval between the first glass plate 11 and the second glass plate 12 without being compressively deformed in the glass panel 10.

Second Embodiment

A second embodiment of a glass panel 10 will be described with reference to FIGS. 8 and 9. The same numerals are given to elements similar to those in the first embodiment, and a description thereof is omitted herein.

Figure 8:
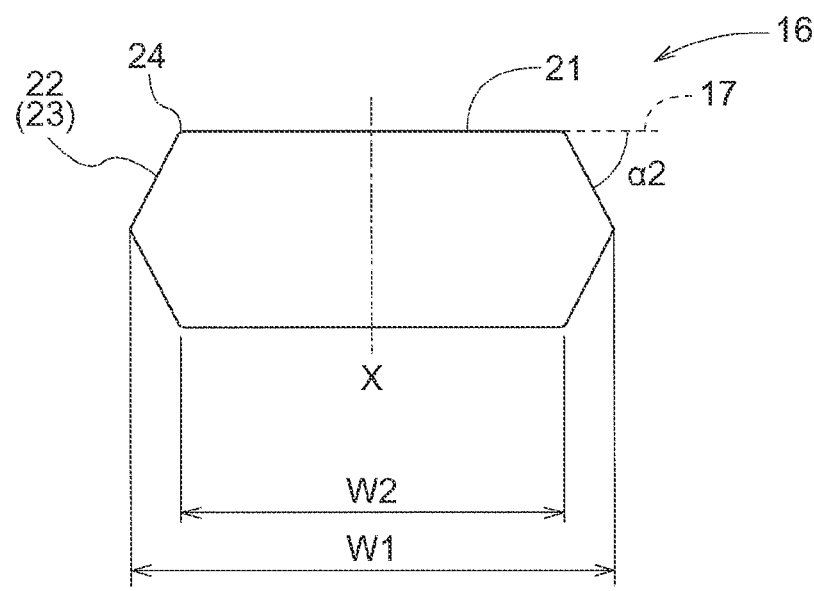
FIG. 8 is a longitudinal sectional view of a column of a second embodiment.
Figure 9:
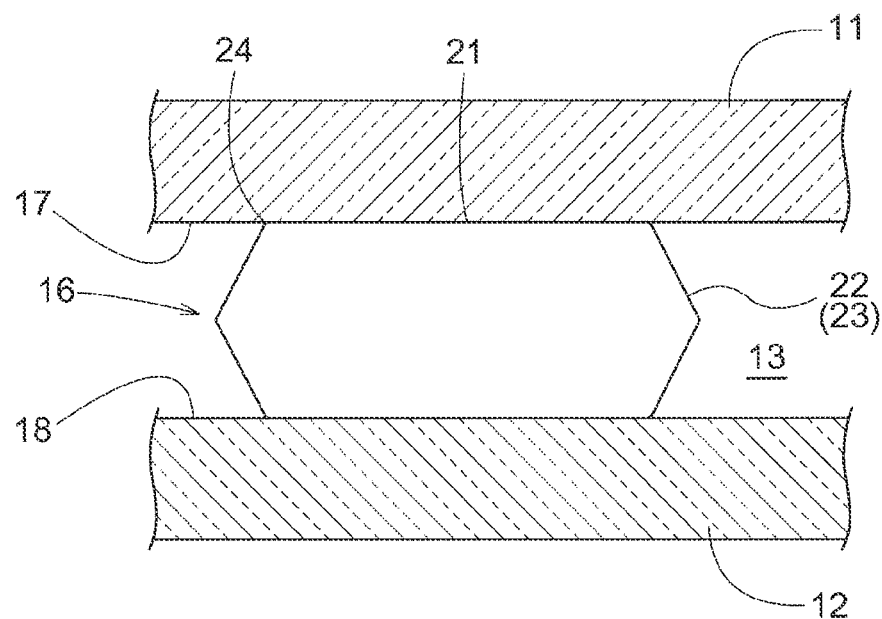
FIG. 9 is a main part longitudinal sectional view of a depressurized multilayer glass panel of the second embodiment.

In this embodiment, as illustrated in FIG. 8, a column 16 includes contact surfaces 21 each being planar, and non-contact portions 23 each formed straight toward an outer periphery 19 of the column 16 from the periphery of the contact surface 21. In this embodiment, the non-contact portion 23 is formed by a non-contact surface 22. As illustrated in FIG. 9, in the glass panel 10, the column 16 is disposed between the first glass plate 11 and the second glass plate 12.

When the contact surfaces 21 of the column 16 are planar, the contact surfaces 21 are in uniform surface contact with the facing surfaces 17, 18 of the first glass plate 11 and the second glass plate 12. Therefore, the column 16 hardly falls so that its posture is easily held between the first glass plate 11 and the second glass plate 12. Further, when the non-contact surfaces 22 (the non-contact portions 23) are formed straight toward the outer periphery 19 in the column 16, it is easy to set a gradient angle α2 of the column 16. Note that a boundary portion 24 between the planar contact surface 21 and the straight non-contact surface 22 serves as a corner so that there is a possibility of concentration of the stress of the glass plate 11, 12 deformed at the corner. Therefore, the boundary portion 24 is preferably rounded.

As illustrated in FIG. 8, a predetermined gradient angle α2 is set for the column 16. The column 16 illustrated in FIGS. 8 and 9 has a shape in which the non-contact surface 22 on the first glass plate 11 side and the non-contact surface 22 on the second glass plate 12 side cross each other at the outer periphery 19. That is, the outer periphery 19 has no thickness (corresponding to the thickness H2 in the first embodiment) in the column 16. Therefore, assuming that a maximum diameter W2 of the contact surfaces 21 is equal to that in the first embodiment, the gradient angle α2 becomes greater than the gradient angle α2 in the first embodiment. In the glass panel 10 illustrated in FIG. 9, the column 16 is configured such that when, for example, the first glass plate 11 is deformed by being subjected to an impact, it is possible to make the deformed first glass plate 11 come in contact with the non-contact surface 22. Specifically, bending occurring on the facing surface 17 of the first glass plate 11 can be supported also by the non-contact surface 22. Consequently, the non-contact surface 22 can absorb the impact to which the first glass plate 11 is subjected, while distributing the impact. As a result, it is possible to enhance the impact strength in the glass panel 10.

[Falling Ball Test]

Figure 10:
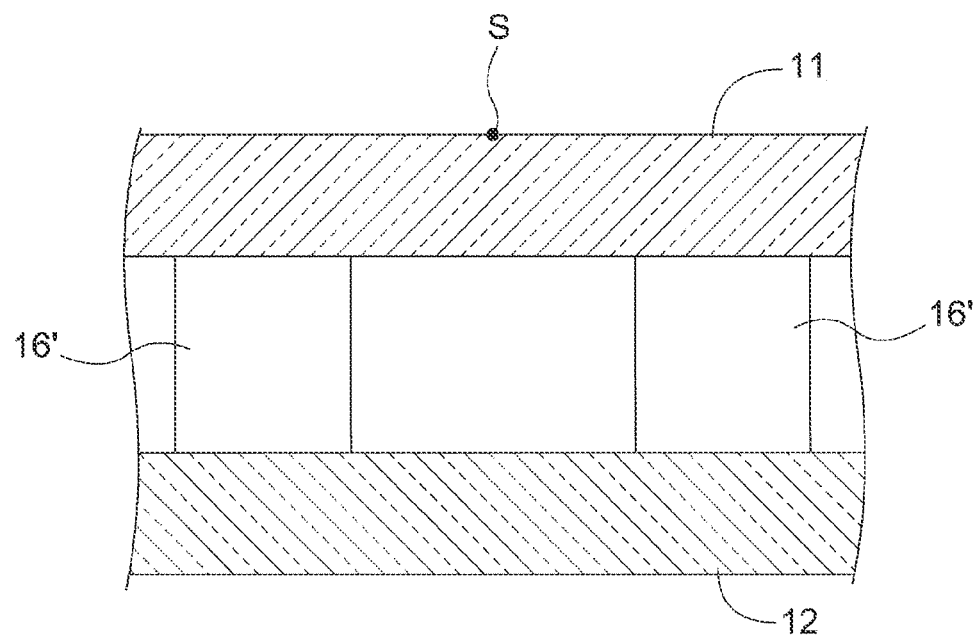
FIG. 10 is a partial longitudinal sectional view of a depressurized multilayer glass panel for a falling ball test.
Figure 11:
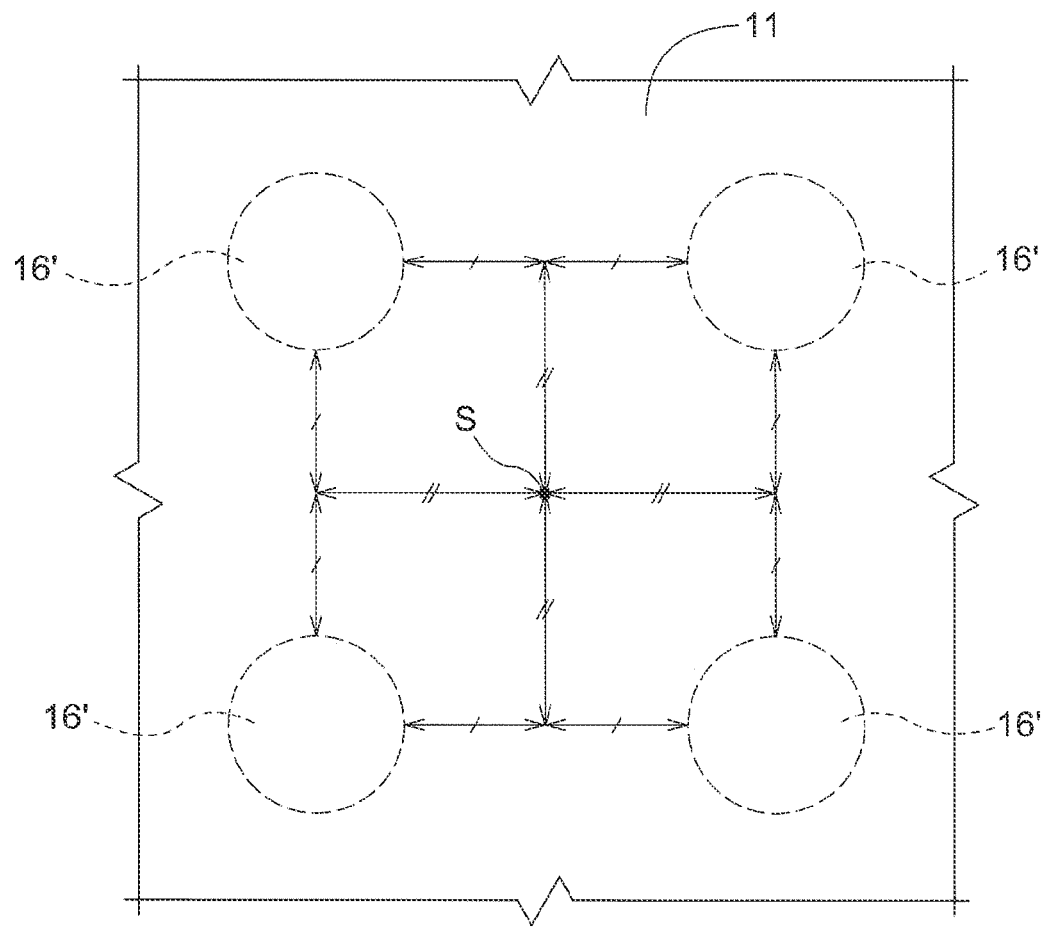
FIG. 11 is a partial plan view of the depressurized multilayer glass panel for the falling ball test.
Figure 12:
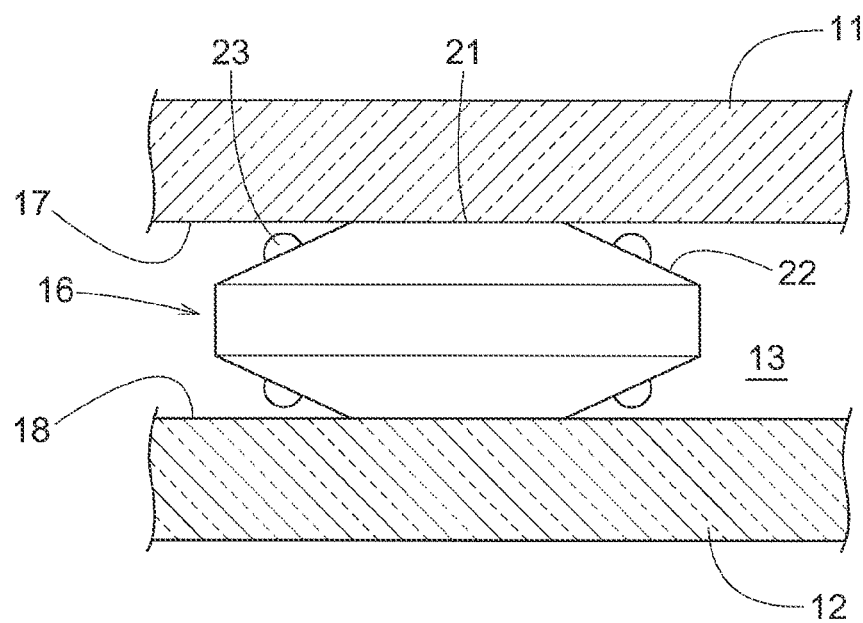
FIG. 12 is a main part longitudinal sectional view of a depressurized multilayer glass panel of another embodiment.

With respect to glass panels of Examples 1 and 2 and Comparative Examples 1 and 2 given below, the following falling ball test was performed to confirm the impact strength. The falling ball test was performed using a method in which columns 16' each having a height of 0.2 mm were disposed at intervals of 20 mm between a first glass plate 11 and a second glass plate 12 (each being 350 mm×350 mm and having a plate thickness of 3.1 mm) to place the first glass plate 11 and the second glass plate 12 in a positional relationship illustrated in FIG. 10, and a ball of 1 kg was dropped at a central position of the first glass plate 11 and at middle positions S (see FIG. 11) between the adjacent columns 16' from above the first glass plate 11. In Examples 1 and 2 and Comparative Examples 1 and 2, the glass plates 11, 12 are common, and only columns differ from each other. Out of the glass plates 11, 12, the first glass plate 11 is Low-E glass, and Low-E films, not illustrated, are laminated on the entirety of a second surface (a surface facing the second glass plate 12) of the first glass plate 11. FIGS. 10 and 11 are diagrams for explaining the outline of the falling ball test, wherein the cylindrical column 16' is illustrated as one example of a column. Note that the shape of a column of Comparative Example 1 given below is the same as that of the column 16' illustrated in FIGS. 10 and 11.

Example 1

In a glass panel of Example 1, columns 16 below are disposed between the first glass plate 11 and the second glass plate 12. The column 16 used in Example has the same shape as that of the column 16 illustrated in FIGS. 3 and 4, wherein the total diameter (maximum diameter W1) is 0.5 mm, the diameter (maximum diameter W2) of the contact surface 21 is 0.2 mm, and the non-contact surface 22 exists in a width of 0.15 mm around the contact surface 21. The height H1 of the column 16 is 0.2 mm, and the height (thickness) H2 of the outer periphery 19 of the column 16 is 0.16 mm. The radius of curvature of the contact surface 21 and the non-contact surface 22 is 1.2 mm, and the gradient angle α1 is 5 degrees.

Example 2

In a glass panel of Example 2, columns 16 below are disposed between the first glass plate 11 and the second glass plate 12. The column 16 used in Example 2 has the same shape as that of the column 16 illustrated in FIG. 8, wherein the total diameter (maximum diameter W1) is 0.5 mm, and the diameter (maximum diameter W2) of the contact surface 21 is 0.42 mm. The height (thickness) H1 of the column 16 is 0.2 mm. In the column of Example 2, the gradient angle α2 formed between the facing surface 17, 18 of the first glass plate 11 or the second glass plate 12 and the non-contact surface 22 is 52 degrees.

Comparative Example 1

In a glass panel of Comparative Example 1, columns below are disposed between the first glass plate 11 and the second glass plate 12. The column (column 16') used in Comparative Example 1 is a cylinder with a diameter of 0.2 mm and with a thickness (height) of 0.2 mm. That is, in the column of Comparative Example 1, contact surfaces in contact with the first glass plate 11 and the second glass plate 12 are of the same size as that in Example 1. In Comparative Example 1, since the column 16' is the cylinder, the gradient angle is 90 degrees.

Comparative Example 2

In a glass panel of Comparative Example 2, columns below are disposed between the first glass plate 11 and the second glass plate 12. The column used in Comparative Example 2 has a shape similar to that of the column 16 illustrated in FIG. 8, wherein the gradient angle differs from that of the column of Example 2. In the column of Comparative Example 2, the gradient angle α2 is 68 degrees. Therefore, the diameter of a contact surface of the column of Comparative Example 2 is 0.42 mm equal to that in Example 2, and the total diameter is also approximately equal (about 0.5 mm) to that of the column of Example 2. The height (thickness) of the column 16 is 0.2 mm.

[Result 1 of Falling Ball Test]

In the falling ball test, the upper limit height of a ball that does not damage the first glass plate 11 is defined as a falling ball clear height. The falling ball clear heights are compared with respect to Example 1 and Comparative Example 1 where the diameters of the contact surfaces are both 0.2 mm Herein, the average value of 15-times falling ball tests was used as a falling ball clear height for comparison. In Example 1, the maximum value of the falling ball clear height was 203 mm, the minimum value of the falling ball clear height was 109 mm, and the falling ball clear height (average value) was 152 mm. In Example 1, while the variation in falling ball clear height was close to 100 mm, the falling ball clear heights were 100 mm or more in all the falling ball tests. On the other hand, in Comparative Example 1, the maximum value of the falling ball clear height was 58 mm, the minimum value of the falling ball clear height was 32 mm, and the falling ball clear height (average value) was 44 mm. In Comparative Example 1, while the variation in falling ball clear height was less than 30 mm, the falling ball clear heights were much less than 100 mm in all the falling ball tests.

In this way, it was proved that the impact strength was high in the glass panel of Example 1 with the column having the non-contact surface 22, as compared to the glass panel of Comparative Example 1 with the column having no non-contact surface 22.

[Result 2 of Falling Ball Test]

The falling ball clear heights are compared with respect to Example 2 and Comparative Example 2 where the diameters of the contact surfaces are both 0.42 mm. Also herein, the average value of 15-times falling ball tests was used as a falling ball clear height for comparison. In Example 2, the maximum value of the falling ball clear height was 312 mm, the minimum value of the falling ball clear height was 185 mm, and the falling ball clear height (average value) was 230 mm. In Example 2, while the variation in falling ball clear height was close to 130 mm, the falling ball clear heights were 100 mm or more in all the falling ball tests. On the other hand, in Comparative Example 2, the maximum value of the falling ball clear height was 292 mm, the minimum value of the falling ball clear height was 73 mm, and the falling ball clear height (average value) was 203 mm. In Comparative Example 2, the variation in falling ball clear height was as large as 219 mm, and there were cases where the falling ball clear height was less than 100 mm in the falling ball test.

In this way, it was proved that the impact strength was high in the glass panel of Example 2 with the gradient angle α2 of the column being set to less than 65 degrees, as compared to the glass panel of Comparative Example 2 with the gradient angle of the column being set to greater than 65 degrees.

Herein, assuming that the first external force is a force when the falling ball clear height is 100 mm in the falling ball test, the glass panels 10 of the first embodiment and the second embodiment are each able to make the falling ball clear height 100 mm or more in the falling ball test by setting the gradient angles α1, α2 to proper angles. Consequently, it is possible to configure the glass panels 10 with the high impact strength.

The heat transfer rates (U-values) of the glass panels of Examples 1 and 2 and Comparative Examples 1 and 2 were measured, and as a result, the U-values were 0.5 W/m2K in Example 1 and Comparative Example 1, and the U-values were 0.9 W/m2K in Example 2 and Comparative Example 2. Herein, the diameters of the contact surfaces 21 of the columns 16, 16' are 0.2 mm in in Example 1 and Comparative Example 1, and the diameters of the contact surfaces 21 of the columns 16, 16' are 0.42 mm in Example 2 and Comparative Example 2. From the above, it can be understood that the heat transfer rates (U-values) of the glass panels are increased in proportion to the diameters (areas) of the contact surfaces 21 of the columns 16, 16'.

Other Embodiments

In the glass panel 10, the column 16 is not limited to the shape shown in each of the embodiments described above, and may have the following shape.

Figure 13:
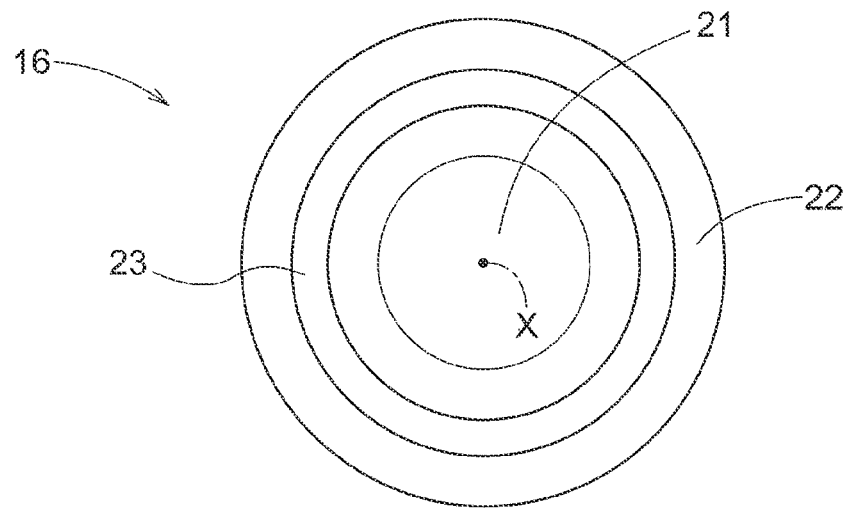
FIG. 13 is a plan view of a column of another embodiment.
Figure 14:
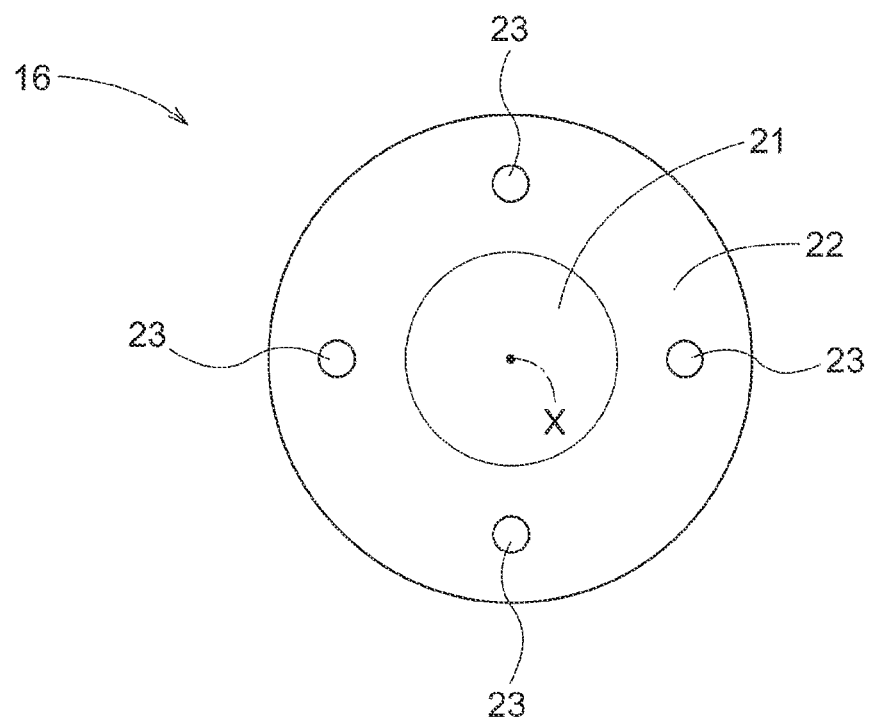
FIG. 14 is a plan view of a column of another embodiment.
Figure 15:
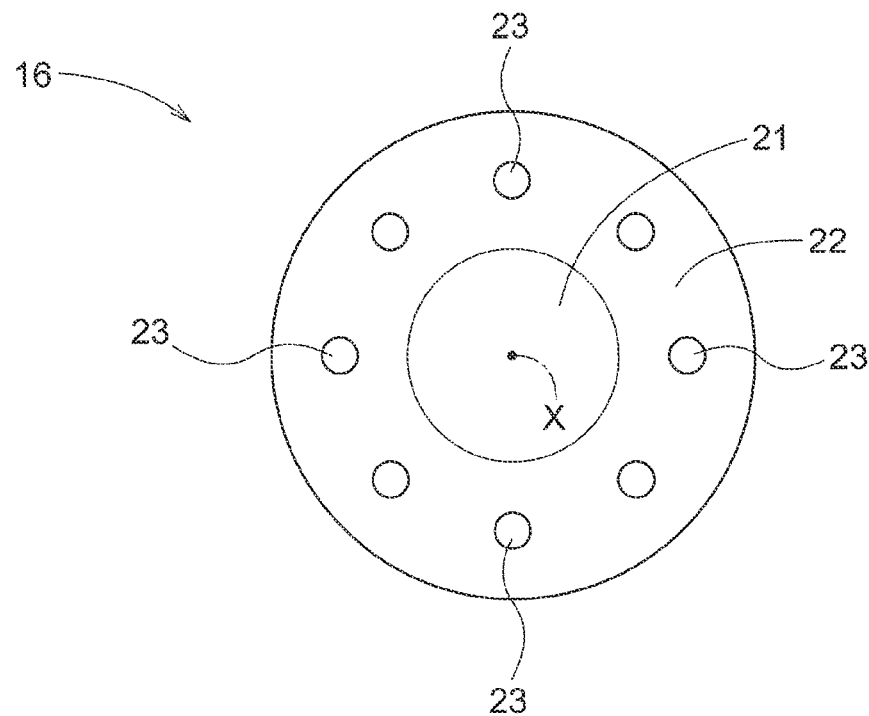
FIG. 15 is a plan view of a column of another embodiment.
Figure 16:
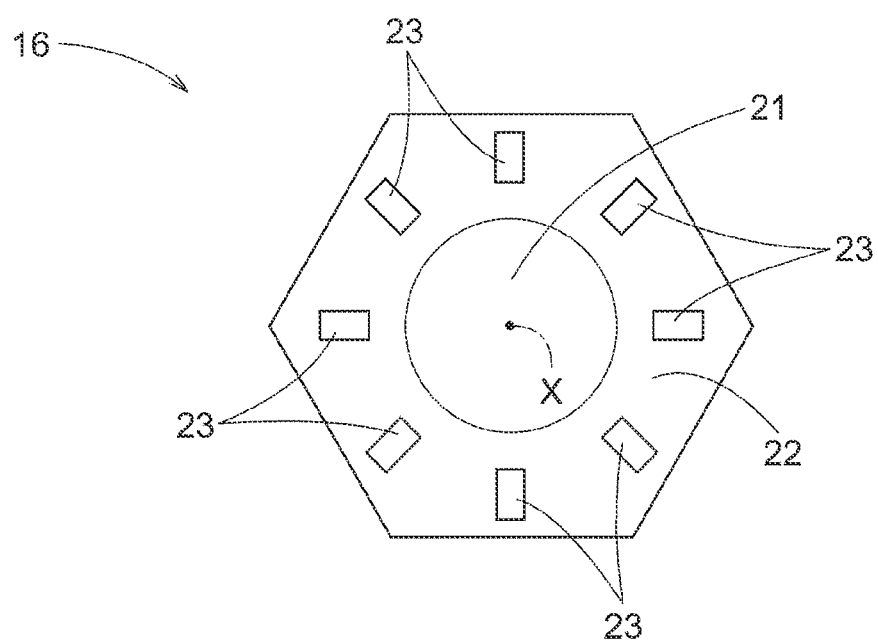
FIG. 16 is a plan view of a column of another embodiment.

(1) As illustrated in FIGS. 12 to 16, a column 16 may be provided with protruding non-contact portions 23 on non-contact surfaces 22. As illustrated in FIG. 13, the protruding non-contact portion 23 may be provided around the entire circumference about the central axis X on the non-contact surface 22. As illustrated in FIGS. 14 to 16, a plurality of protruding non-contact portions 23 may be dispersedly arranged about the central axis X on the non-contact surface 22. In FIG. 14, four protruding non-contact portions 23 are arranged in four directions, and FIGS. 15 and 16, eight protruding non-contact portions 23 are arranged in eight directions. The number of the protruding non-contact portions 23 arranged on the non-contact surface 22 is not particularly limited and may be one or two or more. As illustrated in FIGS. 14 and 15, the protruding non-contact portions 23 may each have a circular shape in plan view of the column 16, or as illustrated in FIG. 16, the protruding non-contact portions 23 may each have a linear shape or the like extending radially. In this way, by providing the non-contact portions 23 on part of the non-contact surfaces 22, it is possible to reduce the total volume of the column 16. The heat transfer rate (U-value) in the column 16 is proportional to the volume of the column 16. Therefore, by shaping the column 16 as illustrated in FIGS. 12 to 16, the column 16 is able to suppress the heat transfer rate (U-value). Further, by reducing the volume of the column 16, it is also possible to suppress the material cost of the column 16.

Figure 17:
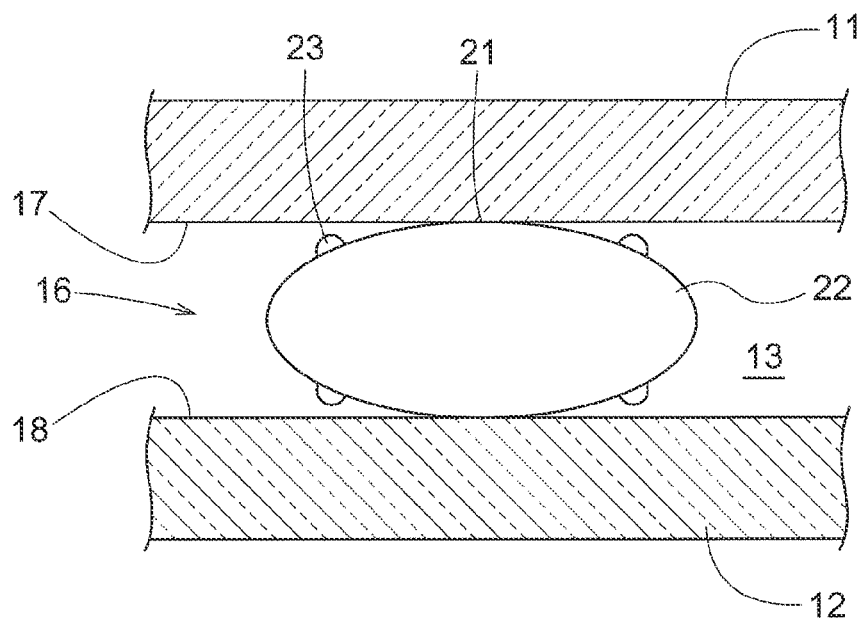
FIG. 17 is a main part longitudinal sectional view of a depressurized multilayer glass panel of another embodiment.

(2) In the first embodiment described above, an example has been given where, in the column 16, the contact surfaces 21 and the non-contact surfaces 22 are in a shape of the spherical cap, and the side surfaces perpendicular to the facing surfaces 17, 18 of the first glass plate 11 and the second glass plate 12 are formed by the flat surfaces. As illustrated in FIG. 17, a column 16 may be formed by a curved surface in its entirety including not only contact surfaces 21 and non-contact surfaces 22, but also side surfaces. Consequently, since the column 16 has no flat surface at the side surface, the column 16 is not held in a posture where the side surface is in contact with the first glass plate 11 or the second glass plate 12. Therefore, it is easy to dispose the column 16 between the first glass plate 11 and the second glass plate 12. With respect to the column 16 illustrated in FIG. 17, an example has been given where protruding non-contact portions 23 are provided on the non-contact surface 22, but the non-contact surface 22 may be a non-contact portion 23 in its entirety with no protruding non-contact portion 23.

Figure 18:
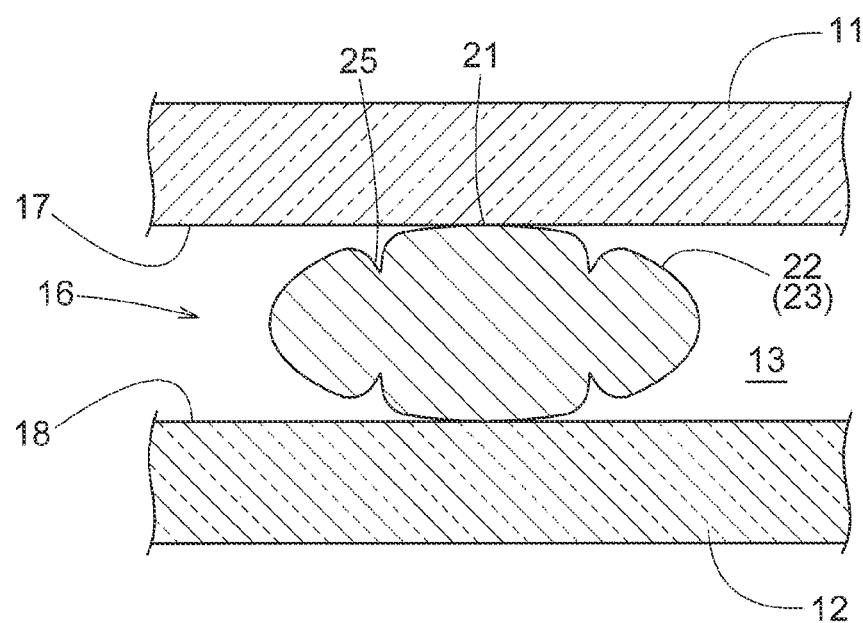
FIG. 18 is a main part longitudinal sectional view of a depressurized multilayer glass panel of another embodiment.
Figure 19:
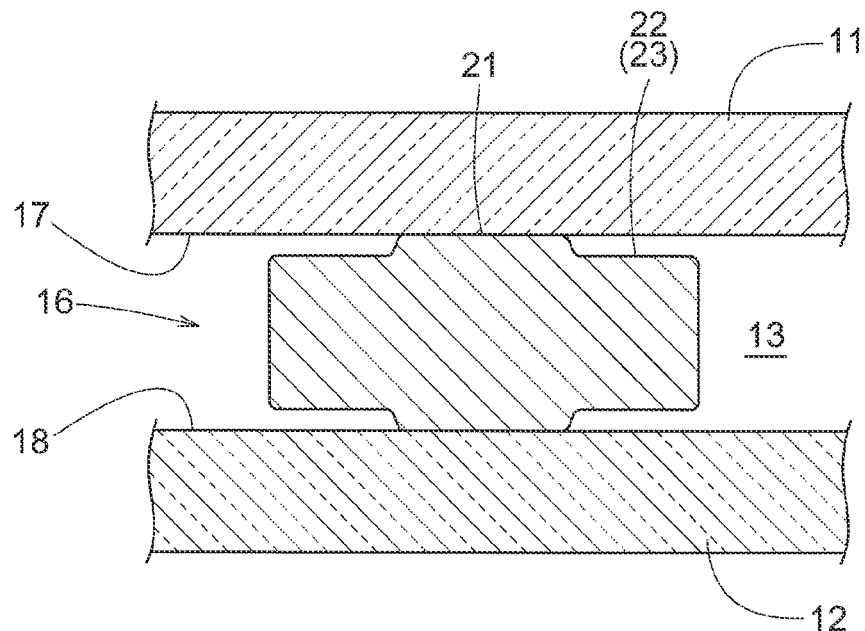
FIG. 19 is a main part longitudinal sectional view of a depressurized multilayer glass panel of another embodiment.
Figure 20:
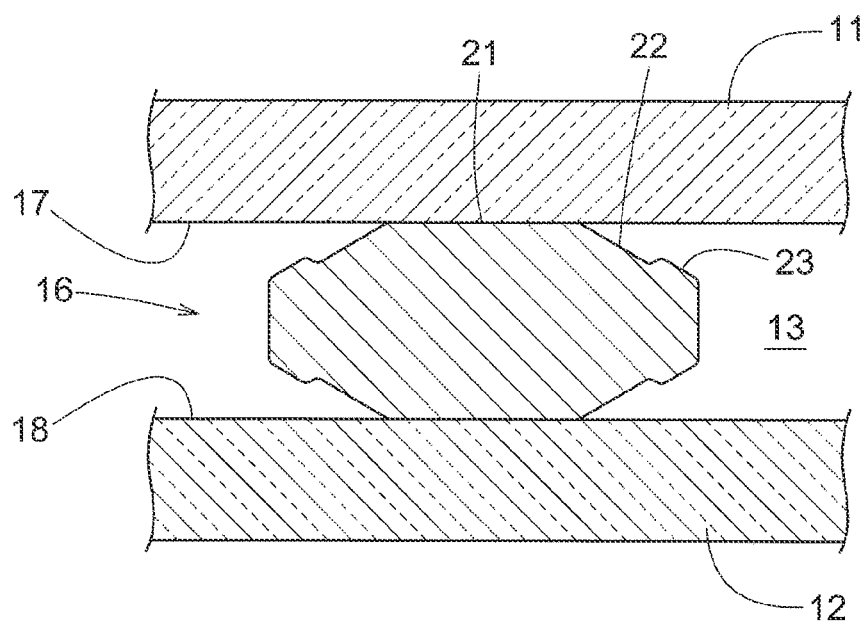
FIG. 20 is a main part longitudinal sectional view of a depressurized multilayer glass panel of another embodiment.

As illustrated in FIG. 18, a column 16 may be formed with groove portions 25 in non-contact surfaces 22, and may have a shape in which contact surfaces 21 and non-contact portions 23 are provided with the groove portions 25 interposed therebetween. In this way, by providing the groove portions 25 in the non-contact surfaces 22, it is possible to reduce the total volume of the column 16. Consequently, the column 16 is able to suppress the heat transfer rate (U-value), and it is also possible to suppress the material cost of the column 16. As illustrated in FIG. 19, in a column 16, non-contact portions 23 may be formed by flat surfaces along the facing surfaces 17, 18 of the glass plates 11, 12 in non-contact surfaces 22. When the non-contact portions 23 are the flat surfaces, the deformed glass plate 11, 12 is supported by the flat surface of the non-contact portion 23, and therefore, it is possible to enhance the impact strength of the glass panel 10. Further, as illustrated in FIG. 20, in a column 16, non-contact portions 23 may each be formed by a projection disposed on the outer peripheral side of a non-contact surface 22 and projecting toward the facing surface 17, 18 of the glass plate 11, 12.

(3) In the embodiments described above, an example has been given where the shape of the column 16 in plan view (view in a direction perpendicular to the plate surfaces (the facing surfaces 17, 18) of the first glass plate 11 and the second glass plate 12) is a circular shape or an octagonal shape. The shape of the column 16 in plan view may be any of another circular shape including an ellipse and an elongated circle, a rectangular shape, a triangular shape, and a polygonal shape with five or more corners (e.g., an octagonal shape illustrated in FIG. 16).

(4) In the embodiments described above, an example has been given where the column 16 is provided with the non-contact surfaces 22 facing the first glass plate 11 and the second glass plate 12. However, the column 16 may be configured such that the contact surface 21 and the non-contact surface 22 face one of the first glass plate 11 and the second glass plate 12, and that only the contact surface 21 faces the other of the first glass plate 11 and the second glass plate 12. Further, in the embodiments described above, an example has been given where, in the column 16, the non-contact portions 23 facing the first glass plate 11 and the second glass plate 12 are provided on the non-contact surfaces 22 or on part of the non-contact surfaces 22. However, the non-contact portions 23 may be provided on only one of the non-contact surfaces 22 facing the first glass plate 11 and the second glass plate 12.

(5) In the first embodiment, an example has been given where the column 16 has the thickness region (thickness H2) at the outer periphery 19, and in the second embodiment, an example has been given where the column 16 has no thickness region at the outer periphery 19. Instead of this, the column 16 of the first embodiment may be configured such that there is no thickness region at the outer periphery 19, and the column 16 of the second embodiment may be configured such that there is a thickness region at the outer periphery 19.

INDUSTRIAL APPLICABILITY

The present invention can be applied to various depressurized multilayer glass panels.

REFERENCE SIGNS LIST

10: vacuum multilayer glass panel (depressurized multilayer glass panel)
11: first glass plate
12: second glass plate
13: air gap portion
14: sealing portion
16: column
17, 18: facing surface
19: outer periphery
21: contact surface
22: non-contact surface
22A1: inner side surface
22A2: outer side surface
23: non-contact portion
W1: maximum diameter of column
W2: maximum diameter of contact surface
H1: total height
H2: height of outer periphery
X: central axis
$\alpha$, $\alpha 1$, $\alpha 2$: gradient angle

The invention claimed is:

1. A depressurized multilayer glass panel comprising:
a first glass plate;
a second glass plate disposed to face the first glass plate;
a sealing portion provided around respective entire outer peripheries of the first glass plate and the second glass plate to form an air gap portion between the first glass plate and the second glass plate, the air gap portion sealed in a depressurized state; and
a plurality of columns disposed between the first glass plate and the second glass plate, each column including contact surfaces in contact with respective facing surfaces of the first glass plate and the second glass plate and a non-contact portion provided around the contact surface and spaced apart from the facing surface of the first glass plate or the second glass plate,
wherein the non-contact portion is configured such that when the facing first glass plate or second glass plate is deformed by being subjected to a first external force, at least a part of the non-contact portion is contactable with the deformed first glass plate or second glass plate;
the columns each further includes a non-contact surface extending outward continuously from a periphery of the contact surface and spaced gradually farther apart from the facing surface of the first glass plate or the second glass plate toward an outer periphery of the column; and
the columns each have a gradient angle between the facing surface of the first glass plate or the second glass plate and the non-contact surface, the gradient angle being such that when the first glass plate or the second glass plate is deformed by being subjected to the first external force, at least a part of the non-contact surface is contactable with the deformed first glass plate or second glass plate, the gradient angle of the column being set to 0.4 degrees or more.

2. The depressurized multilayer glass panel according to claim 1, wherein
the non-contact portion being configured to be contactable refers to a configuration such that when the first glass plate or the second glass plate is deformed by being subjected to a second external force, the deformed first glass plate or second glass plate comes in contact with the non-contact portion before the deformed first glass plate or second glass plate comes in contact with the facing first glass plate or second glass plate.

3. The depressurized multilayer glass panel according to claim 1, wherein:
the non-contact portion is on the non-contact surface.

4. The depressurized multilayer glass panel according to claim 1, wherein:
the non-contact portion is a part of the non-contact surface.

5. The depressurized multilayer glass panel according to claim 1, wherein the gradient angle of the column is set to less than 65 degrees.

6. The depressurized multilayer glass panel according to claim 1, wherein the contact surface of the column is in a shape of a spherical cap.

7. The depressurized multilayer glass panel according to claim 1, wherein the contact surface of the column is planar.

8. The depressurized multilayer glass panel according to claim 1, wherein the non-contact portion of the column is formed straight toward the outer periphery.

9. The depressurized multilayer glass panel according to claim 1, wherein the contact surface and the non-contact portion of the column are in a shape of a spherical cap with a constant radius as a whole.

10. The depressurized multilayer glass panel according to claim 9, wherein a radius of curvature of the contact surface and the non-contact portion is 0.3 mm or more and 20 mm or less.

11. The depressurized multilayer glass panel according to claim 1, wherein
in a falling ball test in which the columns each having the contact surface with a diameter of 0.2 mm and each having a height of 0.2 mm are disposed at an interval of 20 mm between the first glass plate and the second glass plate each being 350 mm×350 mm and having a plate thickness of 3.1 mm, and a ball of 1 kg is dropped at a central position of the first glass plate and at a middle position between the adjacent columns from above the first glass plate, the first external force is a force when the ball has an upper limit height of 100 mm within which the ball does not damage the first glass plate.

12. The depressurized multilayer glass panel according to claim 1, wherein a heat transfer rate is equal to or less than 1.5 W/m2K.

13. A depressurized multilayer glass panel comprising:
a first glass plate;
a second glass plate disposed to face the first glass plate;
a sealing portion provided around respective entire outer peripheries of the first glass plate and the second glass plate to form an air gap portion between the first glass plate and the second glass plate, the air gap portion sealed in a depressurized state; and
a plurality of columns disposed between the first glass plate and the second glass plate, each column including contact surfaces in contact with respective facing surfaces of the first glass plate and the second glass plate and a non-contact portion provided around the contact surface and spaced apart from the facing surface of the first glass plate or the second glass plate,
wherein the non-contact portion is configured such that when the facing first glass plate or second glass plate is deformed by being subjected to a first external force, at least a part of the non-contact portion is contactable with the deformed first glass plate or second glass plate; and
a maximum diameter of regions of the column facing the first glass plate and the second glass plate is 100 μm or more and 1000 μm or less.

14. The depressurized multilayer glass panel according to claim 1, wherein a maximum diameter of the contact surface of the column is greater than 100 μm.

15. A depressurized multilayer glass panel comprising:
a first glass plate;
a second glass plate disposed to face the first glass plate;
a sealing portion provided around respective entire outer peripheries of the first glass plate and the second glass plate to form an air gap portion between the first glass plate and the second glass plate, the air gap portion sealed in a depressurized state; and
a plurality of columns disposed between the first glass plate and the second glass plate, each column including contact surfaces in contact with respective facing surfaces of the first glass plate and the second glass plate and a non-contact portion provided around the contact surface and spaced apart from the facing surface of the first glass plate or the second glass plate,
wherein the non-contact portion is configured such that when the facing first glass plate or second glass plate is deformed by being subjected to a first external force, at least a part of the non-contact portion is contactable with the deformed first glass plate or second glass plate; and
a length of the column in a direction perpendicular to plate surfaces of the first glass plate and the second glass plate is 50 μm or more and 500 μm or less.

16. The depressurized multilayer glass panel according to claim 1, wherein a compressive strength of the column is equal to or more than 200 MPa.

17. The depressurized multilayer glass panel according to claim 1, wherein the columns each contain zirconia.

18. The depressurized multilayer glass panel according to claim 1, wherein
a shape of the column as viewed in a direction perpendicular to plate surfaces of the first glass plate and the second glass plate, is any of a circular shape including an ellipse and an elongated circle, a rectangular shape, a triangular shape, and a polygonal shape with five or more corners.

* * * * *